(12) United States Patent
De Vries

(10) Patent No.: US 7,531,023 B2
(45) Date of Patent: May 12, 2009

(54) METHOD FOR THE PURIFICATION OF A MOLTEN METAL

(75) Inventor: Paul Alexander De Vries, Heemstede (NL)

(73) Assignee: Aleris Switzerland GmbH, Schaffjausen (CH)

( * ) Notice: Subject to any disclaimer, the term of this patent is extended or adjusted under 35 U.S.C. 154(b) by 143 days.

(21) Appl. No.: 10/598,731

(22) PCT Filed: Feb. 17, 2005

(86) PCT No.: PCT/EP2005/001772

§ 371 (c)(1),
(2), (4) Date: Jul. 2, 2007

(87) PCT Pub. No.: WO2005/095658

PCT Pub. Date: Oct. 13, 2005

(65) Prior Publication Data

US 2008/0000326 A1    Jan. 3, 2008

(30) Foreign Application Priority Data

Mar. 19, 2004    (EP)    .................... 04075871

(51) Int. Cl.
*C22B 21/06* (2006.01)
*C22B 9/02* (2006.01)

(52) U.S. Cl. ..................... 75/679; 23/296
(58) Field of Classification Search ............ 75/679, 75/10.11; 23/296, 297
See application file for complete search history.

(56) References Cited

U.S. PATENT DOCUMENTS

| | | |
|---|---|---|
| 1,562,090 A | 11/1925 | Hoopes |
| 1,938,101 A | 12/1933 | Hall |
| 3,211,547 A | 10/1965 | Jarrett et al. |
| 3,296,811 A | 1/1967 | Stoller |
| 3,303,019 A | 2/1967 | Jacobs |
| 3,308,666 A | 3/1967 | Anderson et al. |
| 3,671,229 A | 6/1972 | Ferber et al. |
| 3,839,019 A | 10/1974 | Bruno et al. |
| 3,840,219 A | 10/1974 | Sheridan et al. |
| 3,840,364 A | 10/1974 | Flemmings et al. |
| 3,849,119 A | 11/1974 | Bruno et al. |

(Continued)

FOREIGN PATENT DOCUMENTS

DE    0258283    7/1988

(Continued)

OTHER PUBLICATIONS

Notice of Allowance, Jan. 10, 2008, for U.S. Appl. No. 10/516,888 to DeVries et al.

(Continued)

*Primary Examiner*—Melvin C Mayes
*Assistant Examiner*—James Corno
(74) *Attorney, Agent, or Firm*—Novak Druce + Quigg LLP

(57) ABSTRACT

The invention relates to a method for the purification of a molten metal containing one or more foreign elements. The molten metal is cooled to a eutectic temperature to simultaneously form purified metal crystals and crystals containing at least one foreign element, and at least some of the crystals containing at least one foreign element are separated from the purified metal crystals by using a solid-solid separation technique.

17 Claims, 3 Drawing Sheets

U.S. PATENT DOCUMENTS

Figure 1:
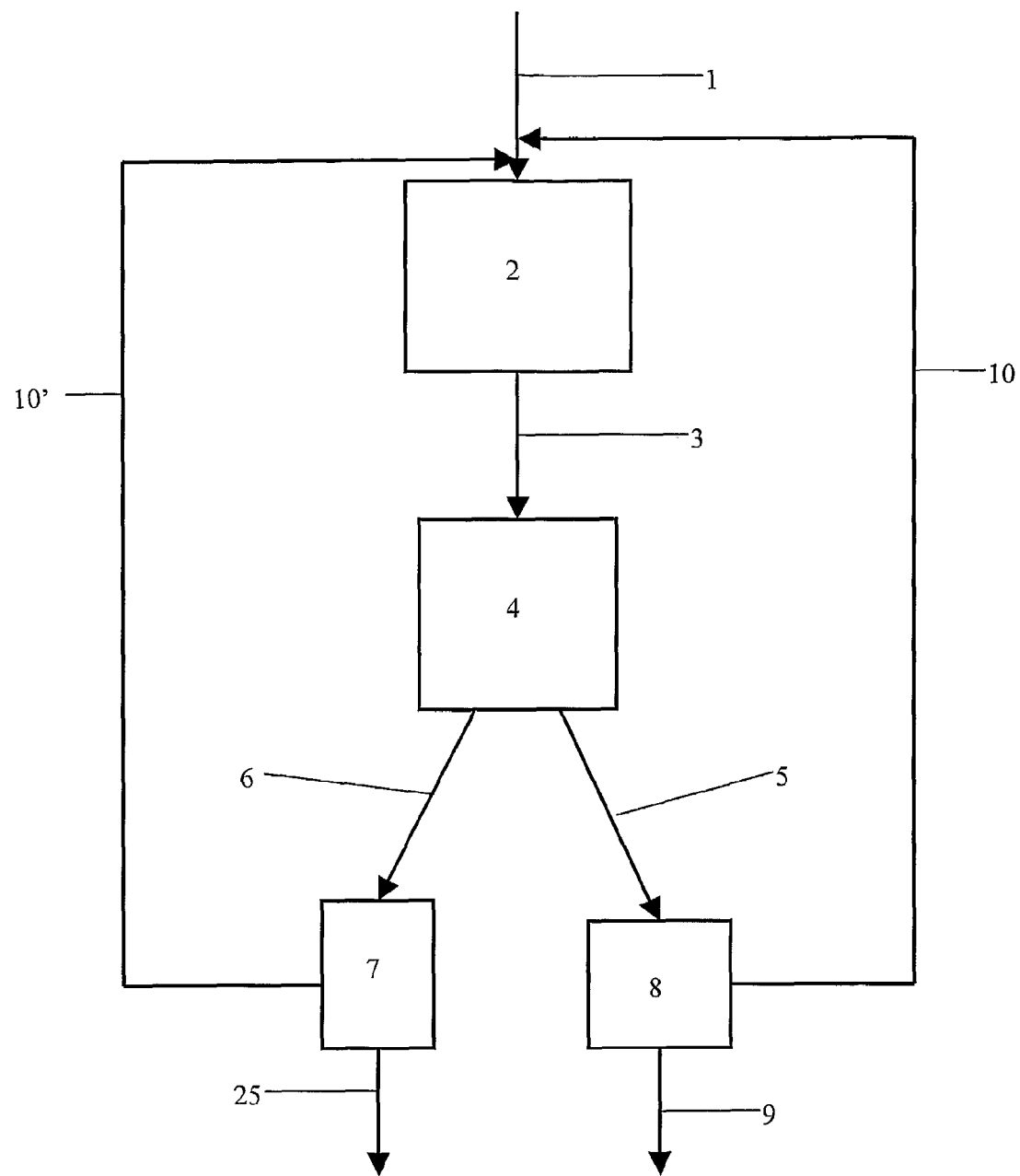

| | | | |
|---|---|---|---|
| 4,043,802 A | 8/1977 | Esdaile et al. |
| 4,050,683 A | 9/1977 | Langhammer |
| 4,099,965 A | 7/1978 | Beguin et al. |
| 4,133,517 A | 1/1979 | Esdaile et al. |
| 4,222,830 A | 9/1980 | Dawless et al. |
| 4,239,606 A | 12/1980 | Dawless et al. |
| 4,243,211 A | 1/1981 | Leroy et al. |
| 4,273,627 A | 6/1981 | Dawless et al. |
| 4,305,763 A | 12/1981 | Quist et al. |
| 4,379,718 A | 4/1983 | Grantham et al. |
| 4,411,747 A | 10/1983 | Dawless et al. |
| 4,456,480 A | 6/1984 | Wintenberger |
| 4,581,062 A | 4/1986 | Boutin |
| 4,736,314 A | 4/1988 | Riese et al. |
| 4,744,823 A | 5/1988 | Raymond-Seraille |
| 4,781,771 A | 11/1988 | Masumoto et al. |
| 5,057,150 A | 10/1991 | Reeve et al. |
| 5,160,532 A | 11/1992 | Benz et al. |
| 5,221,377 A | 6/1993 | Hunt, Jr. et al. |
| 5,312,498 A | 5/1994 | Anderson |
| 5,405,427 A | 4/1995 | Eckert |
| 5,427,602 A | 6/1995 | DeYoung et al. |
| 5,741,348 A | 4/1998 | Van Der Donk et al. |
| 5,968,223 A | 10/1999 | Eckert |
| 6,143,070 A | 11/2000 | Bliss et al. |
| 6,224,648 B1 | 5/2001 | Verdoes et al. |
| 6,290,900 B1 | 9/2001 | Hatano et al. |
| 6,355,085 B1 | 3/2002 | Pillin et al. |
| 6,909,505 B2 | 6/2005 | Lucas et al. |
| 6,972,110 B2 | 12/2005 | Chakrabarti et al. |
| 7,419,530 B2 | 9/2008 | De Vries et al. |
| 7,442,228 B2 | 10/2008 | De Vries |
| 2001/0031823 A1 | 10/2001 | Atchetee et al. |
| 2002/0121319 A1 | 9/2002 | Chakrabarti et al. |
| 2004/0261572 A1* | 12/2004 | De Vries .................. 75/10.11 |
| 2005/0039578 A1 | 2/2005 | De Vries |
| 2005/0145071 A1 | 7/2005 | Cates |
| 2005/0178239 A1 | 8/2005 | De Vries et al. |
| 2006/0162491 A1 | 7/2006 | De Vries et al. |
| 2007/0023110 A1 | 2/2007 | De Vries |
| 2007/0272057 A1 | 11/2007 | De Vries et al. |

FOREIGN PATENT DOCUMENTS

| | | |
|---|---|---|
| DE | 4325793 | 2/1995 |
| EP | 0099948 | 2/1984 |
| EP | 0375308 | 6/1990 |
| EP | 0587274 | 3/1994 |
| EP | 0696646 A2 | 2/1996 |
| EP | 0745693 | 12/1996 |
| EP | 0829552 | 3/1998 |
| EP | 1288319 | 3/2003 |
| EP | 1380659 | 1/2004 |
| FR | 1594154 | 6/1970 |
| GB | 0615590 | 1/1949 |
| GB | 885503 | 12/1961 |
| GB | 974829 | 11/1964 |
| GB | 1352567 | 5/1974 |
| GB | 2154315 | 9/1985 |
| JP | 52135797 | 11/1977 |
| JP | 55050442 | 4/1980 |
| JP | 57152435 | 9/1982 |
| JP | 59205424 | 5/1983 |
| JP | 58104132 | 6/1983 |
| JP | 59028538 | 2/1984 |
| JP | 60234930 | 11/1985 |
| JP | 7070666 | 3/1995 |
| RU | 2105084 | 2/1998 |
| RU | 2112065 C1 | 5/1998 |
| SU | 1589173 | 8/1990 |
| WO | 98/27240 A1 | 6/1998 |
| WO | 02052053 | 7/2002 |
| WO | 2004005558 A1 | 1/2004 |
| WO | 2004005559 A1 | 1/2004 |
| WO | 2005095658 | 10/2005 |

OTHER PUBLICATIONS

Office Action, Jul. 18, 2007, for U.S. Appl. No. 10/516,888 to DeVries et al.

Notice of Allowance, Mar. 18, 2008, for U.S. Appl. No. 10/488,042 to DeVries.

Office Action, May 11, 2007, for U.S. Appl. No. 10/488,042 to DeVries.

Office Action, Oct. 16, 2007, for U.S. Appl. No. 10/488,042 to DeVries.

Office Action, Dec. 3, 2007, for U.S. Appl. No. 10/491,278 to DeVries.

Office Action, Jun. 26, 2007, for U.S. Appl. No. 10/491,278 to DeVries.

Office Action, Aug. 30, 2007, for U.S. Appl. No. 10/516,889 to DeVries et al.

Office Action, Jan. 31, 2008, for U.S. Appl. No. 10/516,889 to DeVries et al.

Hanumanth et al., "Particle Sedimentation During Processing of Liquid Metal-Matrix Composites", Metallurgical Transaction B., vol. 23B, pp. 753-763 (1992).

L.C. Bartel et al., An Electrical Resistivity Measurement in Molten Basalt During the 1983 Kilauea Eruption, Bull. Volcanol., vol. 46.3, pp. 271-276 (1983).

Jo Isenberg-O'Loughlin, "Taming the Thunder," Metal Producing, vol. 33, pp. 21-23 (Sep. 1994).

Notice of Allowance, Jun. 2, 2008, for U.S. Appl. No. 10/488,042 to DeVries.

Notice of Allowance, Jun. 2, 2008, for U.S. Appl. No. 10/516,888 to DeVries et al.

Office Action, May 30, 2008, for U.S. Appl. No. 10/516,889 to DeVries et al.

Office Action of Sep. 9, 2008 for U.S. Appl. No. 11/492,226 to De Vries.

Office Action of Sep. 3, 2008 for U.S. Appl. No. 10/516,888 to De Vries.

Fourth International Symposium on Recycling of Metals and Engineered Materials TMS (The Minerals, Metals & Materials Society) 2000 p. 979-991 "Refining of a 5XXX Series Aluminium Alloy Scrap by Alcoa Fractional Crystallization Process" by Ali I Kahveci and Ali Unal.

De Vries et al.—U.S. Appl. No. 10/577,354, "Method of Cooling Molten Metal During Fractional Crystallisation" Non-Final Office Action mailed Nov. 18, 2008.

Perry's Chemical Engineers' Handbook, 7th ed., McGraw-Hill, 1997, pp. 18-5 to 18-13.

Davis, J.R. (editor), ASM Specialty Handbook, Aluminum and Aluminum Alloys, pp. 207-216 (1993).

The proceedings of the Fourth International Symposium on Recycling of Metals and Engineered Materials, TMS 2000, Kahveci et al., "Refining of a 5XXX Series Aluminum Alloy Scrap By Alcoa Fractional Crystallization Process," pp. 979-991 (2000).

* cited by examiner

METHOD FOR THE PURIFICATION OF A MOLTEN METAL

This application is a §371 National Stage Application of International Application No. PCT/EP2005/001772, filed on 17 Feb. 2005, claiming the priority of European Patent Application No. 04075871.6 flied on 19 Mar. 2004.

The present invention relates to a method for the purification of a molten metal containing one or more foreign elements. The term foreign element is used to indicate an element whose concentration in the purified metal should be reduced as it decreases the value thereof.

The purification of metals can be economically very profitable as it allows scrap metals which may contain different alloying or foreign elements and different amounts of the foreign elements to be processed to regain a standard purity and a higher economic value.

There are several known methods of purifying a molten metal. One example is the Hoopes cell as disclosed in e.g. U.S. Pat. No. 1,562,090 whereby aluminium is refined in an electrolytic cell. Electrochemical processes for large volumes of metal however are very expensive due to the high electrical energy consumption. Furthermore the capital costs are also high due to the horizontal interface required.

Another purification method is fractional crystallisation as described in e.g. U.S. Pat. No. 4,273,627, whereby a hypo-eutectic molten metal containing one or more foreign elements is cooled to achieve partial solidification. The molten metal is cooled to just above a eutectic temperature. The crystals that form in the molten metal have a purer composition than that of the molten metal that is used as a starting point. These crystals can then be separated from the remaining molten metal by means of a solid-liquid separation technique. This process however has the drawback that when the initial concentration of foreign elements is high the amount of purified metal obtained is relatively low and the amount of by-product generated is high. This means the fractional crystallisation method may not be economically feasible for e.g. purifying scrap.

An alternative purification method is by means of separation of foreign elements in which a hyper-eutectic molten metal containing one or more foreign elements is cooled to achieve partial solidification. The molten metal is cooled to a just above a eutectic temperature. The foreign element(s) solidify to form crystals containing at least one foreign element and/or pure crystals of a foreign element which can then be separated from the molten metal using a solid-liquid separation technique. A hypo-eutectic molten metal can be made hyper-eutectic by the addition of certain elements as disclosed in U.S. Pat. No. 5,741,348. This method has the drawback that the liquid product obtained is not very pure and thus is of relatively low value.

An object of the present invention is to provide an improved method for the purification of a molten metal containing one or more foreign elements.

Another object of the present invention is to provide a process from a which a relatively high yield of relatively pure metal can be obtained.

A further object of the invention is to provide a process which can be used to purify large volumes of molten metal containing one or more foreign elements.

Another object of the invention is to provide an economical method for the purification of a molten metal containing one or more foreign elements.

One or more objects of the present invention are achieved by a method for the purification of a molten metal containing one or more foreign elements, which is characterised in that the molten metal is cooled to a eutectic temperature to simultaneously form purified metal crystals and crystals containing at least one foreign element, and in that at least some of the crystals containing at least one foreign element are separated from the purified metal crystals by using a solid-solid separation technique.

The term "crystals containing at least one foreign element" includes intermetallics which are formed when atoms of two or more foreign elements combine in certain proportions to form crystals with a different structure from that of any of the individual foreign elements and also pure crystals of a foreign element. The term "eutectic temperature" refers to a temperature at which at least two solid phases form simultaneously. Eutectic temperature thus refers to the eutectic point for a binary system and to a temperature along the eutectic valley for a ternary, quaternary or higher order system.

Intermetallics or pure crystals of elements present in the molten metal but which are not foreign elements, because their presence is not undesirable in the purified product, may also form in the molten metal and need not be separated from the purified metal crystals.

The term solid-solid separation technique refers to a technique for separating at least one type of solid from another.

The present invention differs from the known methods of metal purification in that the molten metal is cooled to a eutectic temperature and in that a solid-solid separation technique is used to separate at least some of the crystals containing at least one foreign element from the purified metal crystals. If a eutectic temperature is reached during fractional crystallisation crystals will form that are less pure than the molten metal used as a starting point. This results in the process being less efficient at a eutectic temperature when compared to a temperature above the eutectic temperature. If a eutectic temperature is reached during the known method of separation of foreign elements crystals will form that are more pure than the molten metal used as a starting point. These crystals form part of the by-product thereby making the process less efficient at a eutectic temperature when compared to a temperature above the eutectic temperature.

The present invention has the advantage that when the concentration of foreign element(s) in the molten metal to be subjected to the purification method of the present invention, is substantially greater than the solid solubility of the foreign element(s) at a eutectic temperature is substantially smaller than the eutectic concentration and the partition coefficient is less than one, the product obtained is consistently of relatively high purity and the amount of product obtained is relatively high. A product obtained in the form of the purified metal crystals contains substantially less of the foreign element(s) in comparison with the concentration of the foreign element (s) originally present in the molten metal and the amount of by-product is minimised. The crystals containing at least one foreign element contain substantially more of the foreign element(s) in comparison with the concentration of the foreign element(s) originally present in the molten metal. The partition coefficient is the ratio of the concentration of the foreign element(s) in the purified metal crystals to the concentration of the foreign element(s) originally present in the molten metal. The partition coefficient may preferably be less than or equal to 0.5 or more preferably less than or equal to 0.25 in order to obtain higher amounts of purer product.

Examples of partition or distribution coefficients are 0.03 for aluminium containing iron as a foreign element, 0.1 for aluminium containing silicon as a foreign element and 0.93 for aluminium containing manganese as a foreign element. The proceedings of the Fourth International Symposium On Recycling Of Metals And Engineered Materials TMS (The Minerals, Metals & Materials Society) 2000 p. 979-991 "Refining of a 5XXX series aluminium alloy scrap by Alcoa fractional crystallisation process" by Ali I Kahveci and Ali Unal lists the partition or distribution coefficients for some impurities in aluminium.

In general the present method has a higher yield than a fractional crystallisation method operated at just above the eutectic temperature and has a better product purity compared to a method comprising separation of foreign elements which is also carried out at just above the eutectic temperature.

The present invention also has the advantage that accurate temperature control is not necessary unlike the known fractional crystallisation and separation of foreign elements methods. When using the method of the present invention the system is self-regulating and maintains itself at eutectic temperature in a large solidification range. A solid fraction measurement, which need not be stringently accurate, can be used to control the process. Solid-solid separation generally becomes difficult when the solid fraction is above 30%. An energy measurement can also be used to control the process.

It is possible and could be advantageous when prior to the application of the solid-solid separation technique at least some of the purified metal crystals and the crystals containing at least one foreign elements are substantially simultaneously separated from substantially the total amount of molten metal. The solid-solid separation step can then be achieved by e.g. adding the mixture of purified metal crystals and crystals containing at least one foreign element to molten salt with a specific density between that of the specific densities of the purified metal crystals and the crystals containing at least one foreign element so that some of the crystals sink into the salt whilst the remainder float on the salt.

Preferably the solid-solid separation technique is executed by separating the purified metal crystals and the crystals containing at least one foreign element into multiple fractions, wherein the ratio of the concentration of the purified metal crystals and the concentration of the crystals containing at least one foreign element in one of the fractions is higher than the ratio thereof in the molten metal. One of the streams preferably contains at least double the concentration of the foreign element originally present in the molten metal. If more than one foreign element is present it may be necessary to separate the molten metal containing the purified metal crystals and crystals containing at least one foreign element into more than two fractions.

As a further alternative at least some of the crystals containing at least one foreign element may be separated from substantially the total amount of molten metal containing purified metal crystals. Preferably at least 30% of the crystals containing at least one foreign element are separated from the substantially the total amount of molten metal containing purified metal crystals. In this alternative embodiment the crystals containing at least one foreign element are separated from the molten metal without a significant amount of either crystallised or molten metal also being separated along with the crystals containing at least one foreign element. Although it is desirable to avoid including any molten metal when separating the crystals containing at least one foreign element, in practice this is not achievable. Preferably the volume of molten metal separated along with the crystals containing at least one foreign element is less than the volume of crystals containing at least one foreign element separated. If desired the purified metal crystals can then be removed relatively easily from the remaining molten metal.

A preferred method for solid-solid separation is by using centrifugal force. The application of centrifugal force selectively moves the crystals containing at least one foreign element and purified metal crystals due to their difference in density and size so a portion of the molten metal containing most of the purified metal crystals can be separated from the remainder of the molten metal containing most of the crystals containing at least one foreign elements.

A further preferred method for solid-solid separation is by using an electromagnetic field. This method advantageously uses the fact that crystals containing at least one foreign elements are less conductive than the molten metal whilst the molten metal is less conductive than the purified metal crystals. An electromagnetic field generated by a magnet applied across a flow of the molten metal containing the purified metal crystals and crystals containing at least one foreign elements could be used to separate the flow into a portion a molten metal containing most of the purified metal crystals and a portion containing most of the crystals containing at least one foreign elements. Such a method is described in e.g. U.S. Pat. No. 6,355,085.

Another preferred method for solid-solid separation is by using a floatation technique. Due to the difference in density and particle size between the purified metal crystals and the crystals containing at least one foreign element the purified metal crystals and crystals containing at least one foreign elements have different affinities for gas bubbles. By supplying gas bubbles to the molten metal containing the purified metal crystals and crystals containing at least one foreign element, the purified metal crystals for example may be borne up through the molten metal to an upper region of the molten metal with the gas bubbles whilst the crystals containing at least one foreign element remain in a lower region of the molten metal.

The abovementioned methods for separating the molten metal containing the purified metal crystals and crystals containing at least one foreign element into multiple fractions, containing various concentrations of the crystals containing at least one foreign element, may include an additional solid-liquid separation step to remove the crystals containing at least one foreign element from the molten metal. Such a step may comprise e.g. filtration or centrifugation. As centrifugal force is directly proportional to mass the difference in specific density between the crystals containing at least one foreign elements and the molten metal leads to a different centrifugal force being exerted on the crystals containing at least one foreign elements in comparison with the molten metal which can be used to separate the crystals containing at least one foreign elements from the molten metal.

A preferred method for separating at least some of the crystals containing at least one foreign element from substantially the total amount of molten metal containing purified metal crystals is by bringing a layer of salt into contact with a layer of the molten metal containing both the purified metal crystals and crystals containing at least one foreign element, using means to transport at least some of the crystals containing at least one foreign elements into the salt layer and separating the purified metal crystals from the molten metal. The means for bringing substantially all the crystals containing at least one foreign element into contact with the salt may be, for example, stirring means. Once the crystals containing at least one foreign element are brought into contact with the salt they can be retained in the molten salt due to their difference in specific density in comparison with the molten metal and the purified metal crystals. The purified metal crystals are also brought into contact with the salt but are not retained due to their difference in specific gravity. The crystals containing at least one foreign element can be relatively easily removed from the salt and the purified metal crystals can be separated from the molten metal by e.g. filtration. The salt preferably has a melting point below the eutectic temperature at which the process is performed.

The method of the present invention is particularly suitable for purifying molten aluminium which contains at least one foreign alloying element. Primary aluminium production from aluminium ore is very energy intensive and expensive making recycling more viable. However, using the prior art methods of metal purification it is still often not economically viable to purify aluminium scrap without adding relatively pure primary aluminium to the scrap to effectively dilute the foreign element(s) present. Using the method of the present invention large volumes of aluminium alloy scrap can be cost-effectively purified without requiring the addition of large amounts of pure primary aluminium.

The present invention can advantageously be used to remove one or more foreign elements such as iron, silicon, copper, manganese and magnesium which are often present in aluminium alloy scrap in varying quantities.

The present invention may also be advantageously applied in a continuous process so the purified metal crystals and crystals containing at least one foreign element are formed and separated continuously. By continuously supplying molten metal above the eutectic temperature to molten metal which has already been cooled to the eutectic temperature, and in which crystals containing at least one foreign element have already been formed, and maintaining the temperature of the molten metal at the eutectic temperature the crystals containing at least one foreign element are encouraged to grow larger. This is because the crystals containing at least one foreign element which were already present in the molten metal act as nucleation sites for the crystals containing at least one foreign element which form out of the molten metal subsequently added. The greater the size of the crystals containing at least one foreign element the relatively easier it is to separate them from the crystals of purified metal. Both the purified metal crystals and crystals containing at least one foreign element can grow to sizes larger than 50 μm and up to 200 μm.

Preferably the molten metal containing one or more foreign elements is subjected to a fractional crystallisation process and a solid-liquid separation technique before the remaining molten metal is cooled to a eutectic temperature to simultaneously form purified metal crystals and crystals containing at least one foreign element. By subjecting the molten metal containing one or more foreign elements to a fractional crystallisation process and a solid-liquid separation technique a large amount of the purified aluminium crystals are separated from the remaining molten metal before it is cooled to the eutectic temperature. The crystals containing one or more foreign elements which form at a eutectic temperature are not constrained in a crystal matrix which means larger crystals containing one or more foreign elements can form. Larger crystals are easier to separate using a solid-solid separation technique. Subjecting the molten metal containing one or more foreign elements to a fractional crystallisation process and a solid-liquid separation technique before the remaining molten metal is cooled to a eutectic temperature can also be used in situations where the concentration of foreign element(s) in the molten metal to be subjected to the purification method of claim 1, is initially less than the solid solubility of the foreign element(s) at a eutectic temperature. After the formation and separation of the purified metal crystals the concentration of foreign elements in the remaining molten metal may be greater than the solid solubility of the foreign element(s) at eutectic temperature and can then effectively be purified by the method as set out in claim 1.

Subjecting the molten metal containing one or more foreign elements to a fractional crystallisation process and a solid-liquid separation step before the remaining molten metal is cooled to a eutectic temperature is most preferably used for a non-continuous or batch process.

The molten metal containing one or more foreign elements remaining after the solid-solid separation step is preferably subjected to a fractional crystallisation process and a solid-liquid separation technique. This further increases the purity of the product.

More preferably the molten metal containing one or more foreign elements remaining after the solid-liquid separation technique is then cooled to a eutectic temperature to simultaneously form purified metal crystals and crystals containing at least one foreign element, and in that at least some of the crystals containing at least one foreign element are then separated from the purified metal crystals by using a solid-solid separation technique. This further decreases the amount of by-product generated by the process.

Table 1 shows the theoretical advantage obtainable when the present invention is used to purify 100 kg of molten aluminium containing 0.5 wt % Fe in comparison with using fractional crystallisation to purify the aluminium.

TABLE 1

|  |  | AL [wt %] | Fe [wt %] | Mass [kg] |
| --- | --- | --- | --- | --- |
| Input |  | 99.5 | 0.5 | 100 |
| Fractional crystallisation | Product in form of purified Al crystals | 99.95 | 0.05 | 76 |
|  | By-product in form of liquid Al and Fe | 98.1 | 1.9 | 24 |
| Method of invention | Product in form of purified Al crystals | 99.95 | 0.05 | 99 |
|  | By-product in form of crystals containing Fe | 59 | 41 | 1 |

As can be seen from table 1 the method of the present invention results in a higher amount of purified product of purified metal crystals than the fractional crystallisation method (i.e. 99 kg in comparison with 76 kg) although the Fe content in the purified metal crystals is the same for both methods. When using the fractional crystallisation method the by-product contains far more aluminium than the by-product generated when using the method of the present invention.

Both the purified metal crystals obtained using fractional crystallisation and the method of the invention can contain as little as 0.05 wt % Fe as this is the solid solubility of Fe in aluminium at the eutectic temperature. However when using the fractional crystallisation method the maximum amount of iron that can be present in the liquid by-product is 1.9 wt % as this is the eutectic concentration of iron in aluminium. When using the method of the invention the by-product obtained can theoretically contain up to 41 wt % Fe which is the concentration of iron in the $Al_3Fe$ intermetallics which are formed.

Table 2 shows the advantage obtained when the present invention is used to purify 100 kg of molten aluminium containing 3.0 wt % Fe in comparison with using separation of crystals containing at least one foreign element to purify the aluminium.

TABLE 2

|  |  | AL [wt %] | Fe [wt %] | Mass [kg] |
|---|---|---|---|---|
| Input |  | 97.0 | 3.0 | 100 |
| Separation of foreign elements | Product in form of molten Al | 98.1 | 1.9 | 97 |
|  | By-product in form of crystals containing Fe | 59 | 41 | 3 |
| Method of invention | Product in form of purified Al crystals | 99.95 | 0.05 | 93 |
|  | By-product in form of crystals containing Fe | 59 | 41 | 7 |

As can be seen from table 2 when the molten metal supplied is of hyper-eutectic composition the method according to the present invention gives less product (93 kg per 100 kg as opposed to 97 kg) but the iron content in the purified aluminium crystals can be considerably lower than the minimum amount of iron in the molten aluminium product that is achievable when using the separation of foreign elements method. Thus overall the method of the present invention gives a more economically valuable product although the minimum amount of by-product achievable higher than that achievable using the separation of foreign elements method. When separating out the foreign elements the maximum obtainable purity of the product is approximately equal to the eutectic concentration of iron in aluminium i.e. 1.9 wt % Fe.

The present invention can also be used with ternary systems e.g. aluminium containing both Fe and Si.

The following example considers 100 kg of aluminium containing 0.5 wt % Fe and 0.5 wt % Si. The following results are obtained by using Factsage™ software and the Thermotech Al-data database. Equilibrium is assumed at all temperatures.

The solidification of the metal from the fully molten state at 660° C. to the fully solidified state at 600° C. is considered. Purified aluminium crystals (AL-fcc) start to form at 655.8° C. These crystals initially contain 0.01 wt % Fe and 0.05 wt % Si and are clearly far more pure than the liquid.

The solidification of $Al_3Fe$ starts at 644.9° C. This is the start of the range of temperatures referred to in the present application as eutectic. At 644.9° C. the purified aluminium crystals contain 0.04 wt % Fe and 0.16 wt % Si. The amount of Fe and Si in the purified aluminium crystals has increased because a considerable amount (76 kg) of aluminium containing virtually no Fe or Si has already solidified out of the molten metal which has become more impure and contains 1.9 wt % Fe and 1.6 wt % Si.

When the solidification of $Al_3Fe$ starts at 644.9° C. the $Al_3Fe$ crystals contain 40.8 wt % Fe and 0.25 wt % Si. They can be considered highly impure in Fe and the invention aims to separate such crystals from the purified aluminium crystals. At just above 630.6° C. the $Al_3Fe$ crystals still contain 40.8 wt % Fe but the Si content has increased to 0.7 wt %. The purified aluminium crystals contain 0.04 wt % Fe and 0.4 wt % Si at this stage which is still more pure than the original molten aluminium.

Between the temperatures of 644.9° C. and 630.6° C. a further 20.5 kg of purified aluminium crystals is formed. The total amount of purified aluminium crystals is 96.5 kg. The remaining liquid metal only makes up 2.5 wt % of the system.

At 630.6° C. another crystal AlFeSi-α starts to form. These crystals contain 19 wt % Fe and 10 wt % Si and are therefore highly impure. The separation of these crystals from the purified aluminium crystals thus also results in purification. During this crystallisation step the temperature does not change and in this respect the solidification behaves like the solidification of a pure metal i.e. at a solidification point, or a eutectic binary metal. This point is the ternary eutectic point. At this point over a zero temperature range the remaining 2.5 wt % of the mass solidifies.

The above is summarised in Table 3.

TABLE 3

| Temperature - range (° C.) | Purified Al crystals (kg) | Al3Fe by-product (kg) | AlFeSi-α by-product (kg) | Liquid (kg) |
|---|---|---|---|---|
| 655.8-644.9 | 75 | 0 | 0 | 25 |
| 644.9-630.6 | 96.5 | 1.0 | 0 | 2.5 |
| 630.6 | 98.64 | 0.22 | 1.14 | 0 |

Assuming for simplicity that the by-products can be wholly separated from the purified aluminium crystals Table 4 shows the net result of the process.

TABLE 4

|  | Product | By-product 1 | By-product 2 | Net by-product |
|---|---|---|---|---|
| Total (kg) | 98.64 | 0.22 | 1.14 | 1.36 |
| % Fe | 0.04 | 41 | 19 | 34 |
| % Si | 0.4 | 0.7 | 10 | 7 |

In a batch process carried out according to the invention unless special provisions are made then the 75 wt % solid aluminium that forms between 655.8-644.9° C. will form a solid matrix in which no turbulent liquid motion is possible. After further cooling the by-product of crystals containing Fe or Fe and Si will be very small crystals. Small crystals are more difficult to separate from the purified aluminium crystals.

However, the purified aluminium crystals formed between 655.8-644.9° C. may be removed from the molten aluminium by e.g. fractional crystallisation and a solid-liquid separation step. The molten aluminium remaining will then be near the eutectic valley. With all the crystals removed from the molten aluminium the further eutectic solidification of two phases is not geometrically confined in a crystal matrix which means larger crystals can form. This is particularly the case when the liquid is stirred. The formation of larger crystals means crystals containing at least one foreign element e.g. Fe which are denser than aluminium can be selectively removed from the molten aluminium leaving a slurry of eutectic liquid and purified crystals of aluminium. The slurry can then be separated using a solid-liquid separation technique whilst the remaining eutectic liquid can be recirculated into the crystalliser.

The process can also be carried continuously in a continuous crystalliser comprising e.g. a cooling vessel. Molten aluminium containing one or more foreign elements, is cooled to a eutectic temperature in the vessel to simultaneously form purified aluminium crystals and crystals containing at least one foreign element. The solid fraction of the contents of the vessel is substantially maintained at e.g. 10%. As soon as the solid fraction becomes higher than 10% the cooling is reduced and as soon as the solid fraction falls below 10% the cooling is increased. Simultaneously the purified aluminium crystals and crystals containing at least one foreign element are removed from the molten aluminium at a rate which equals the formation rate. The crystals form according to the mass balance given in table 4 above. This means that although the composition in the vessel is eutectic and stays eutectic, the composition of the continuous input of molten aluminium containing foreign element(s) determines how much product and by-product are formed.

It should be noted that within the fairly large eutectic temperature range further choices can be made to optimise the size, shape and composition of the by-product.

The above calculations show that from 100 kg of aluminium containing 0.5 wt % Fe and 0.5 wt % Si the invention gives a very high potential yield of 98.64 kg of product containing only 0.04 wt % Fe and with a slightly reduced Si content of 0.4 wt %.

The aluminium alloy product obtained containing 0.04 wt % Fe and 0.4 wt % Si can be further purified by means of at least one fractional crystallisation step which also gives a liquid waste which is almost eutectic and can be used in the process of the present invention.

The invention will now be illustrated with reference to the following diagrammatic representations of the invention in FIGS. 1 to 3.

In FIG. 1 reference number 1 indicates the supply of a metal containing at least one foreign element, preferably in molten form, to a first process vessel 2. In the process vessel 2 the molten metal is cooled to the eutectic temperature to simultaneously form purified metal crystals and crystals containing at least one foreign element. Number 3 indicates the supply of molten metal containing purified metal crystals and crystals containing at least one foreign element to a further process vessel 4 in which the molten metal containing the purified metal crystals and crystals containing at least one foreign element is separated into multiple fractions, containing various concentrations of the crystals containing at least one foreign element. The separation of the molten metal containing the purified metal crystals and crystals containing at least one foreign element into multiple fractions may be performed in the same vessel in which crystallisation occurs. The separation may be performed by using a centrifuge which selectively moves the crystals containing at least one foreign element and purified metal crystals due to their difference in density or by using an electromagnetic field which selectively moves the crystals containing at least one foreign element and purified metal crystals due to the difference in conductivity between them or by using a floatation technique which selectively moves the crystals containing at least one foreign element and purified metal crystals due to their different affinities for gas bubbles. Number 5 indicates the removal of the molten metal comprising a lower concentration of the crystals containing at least one foreign element and a higher concentration of the purified metal crystals. The molten metal can be supplied as a final product or alternatively the purified metal crystals can be separated from the molten metal in process step 8 and supplied as a final product 9 whilst the molten metal 10 is reintroduced to the first process vessel 2. Re-cycling the molten metal results in the advantage that the by-products from the process are minimised. Number 6 indicates the transportation of the molten or solid metal which comprises a higher concentration of the crystals containing at least one foreign element to a third process vessel 7 in which most of the crystals containing at least one foreign element are separated from the molten metal using e.g. filtration or centrifugation or may be otherwise separated from the metal once solidified. The remaining molten metal 10' can be regarded as a final product or may be reintroduced to the first process vessel 2 if the amount of crystals containing at least one foreign elements remaining in the molten metal is considered to be too high. Re-cycling the molten metal also results in the advantage that the by-products 25 from the process are minimised.

Figure 2:
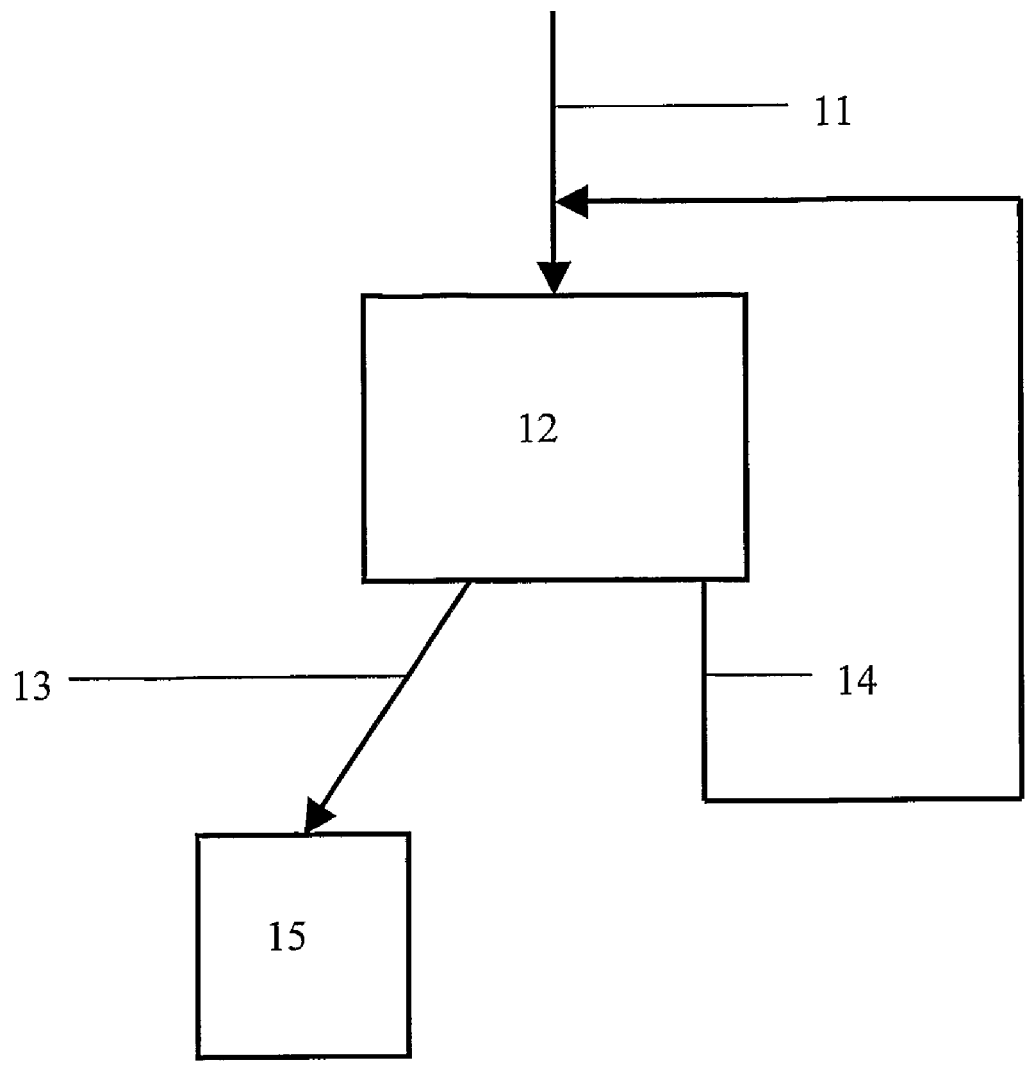

Number 11 in FIG. 2 indicates the supply of a metal containing at least one foreign element, preferably in molten form, to a first process vessel 12. In the process vessel 12 the molten metal is cooled at the eutectic temperature to simultaneously form purified metal crystals and crystals containing at least one foreign element. The majority of purified metal crystals and the crystals containing at least one foreign element are subsequently substantially simultaneously separated from substantially the total amount of molten metal. Number 13 indicates the transportation of the purified metal crystals and the crystals containing at least one foreign element which have been removed from substantially the total amount of the molten metal. The purified metal crystals and crystals containing at least one foreign element are separated from each other in process step 15. Process step 15 may comprise adding the mixture of purified metal crystals and crystals containing at least one foreign element to molten salt with a specific density between that of the specific densities of the purified metal crystals and the crystals containing at least one foreign element so that some of the crystals sink into the salt whilst the remainder float on the salt. The molten metal 14 may be regarded as a final product or may be recycled into the process vessel 12 to form part of the metal containing at least one foreign element in the vessel 12 thereby helping to minimise the by-products generated by the process.

Figure 3:
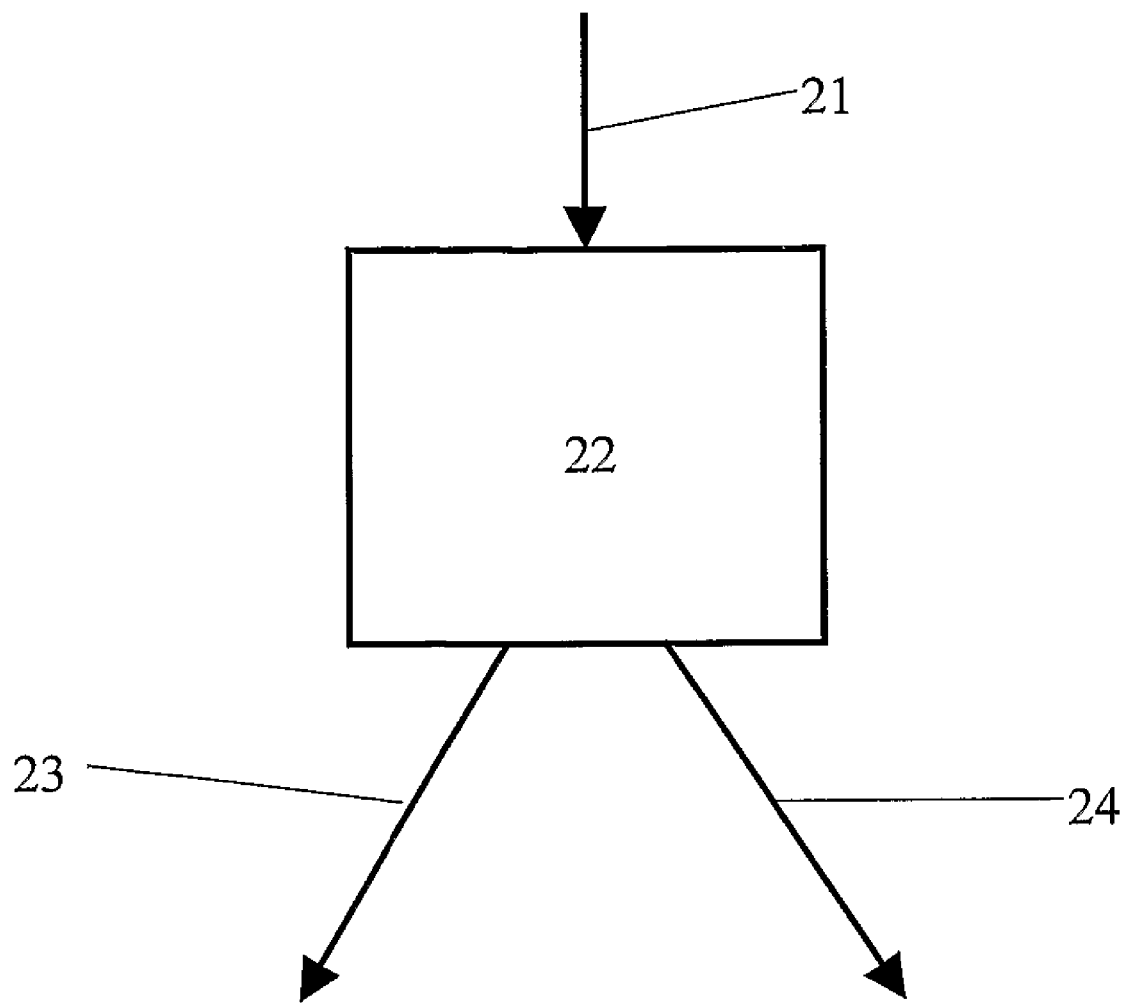

In FIG. 3 number 21 indicates the supply of a metal containing at least one foreign element, preferably in molten form, to a process vessel 22. In the process vessel 22 the molten metal is cooled at the eutectic temperature to simultaneously form purified metal crystals and crystals containing at least one foreign element. The process vessel may also contain a layer of molten salt in contact with a layer of the molten metal containing both the purified metal crystals and crystals containing at least one foreign elements, and means to transport substantially all the crystals containing at least one foreign element into the molten salt layer. The salt layer containing the substantially all the crystals containing at least one foreign element can then be separated from the molten metal containing purified metal crystals as indicated by number 23 and the purified metal crystals are also separated from the molten metal as a final product as indicated by number 24. The molten metal can be retained in the process vessel.

The invention claimed is:

1. Method for the purification of a molten metal containing one or more foreign elements, comprising:

cooling the molten metal to a eutectic temperature to simultaneously form purified metal crystals and crystals containing at least one foreign element, and separating at least some of the crystals containing at least one foreign element from the purified metal crystals by using a solid-solid separation technique.

2. Method according to claim 1, wherein prior to the application of the solid-solid separation technique at least some of the purified metal crystals and the crystals containing at least one foreign element are substantially simultaneously separated from substantially the total amount of molten metal.

3. Method according to claim 1, wherein the solid-solid separation technique is executed by separating the purified metal crystals and the crystals containing at least one foreign element into multiple fractions, wherein the ratio of the concentration of the purified metal crystals and the concentration of the crystals containing at least one foreign element in one of the fractions is higher than the ratio thereof in the molten metal.

4. Method according to claim 3, wherein the solid-solid separation is executed using centrifugal force.

5. Method according to claim 4 additionally comprising, after the solid-solid separation step, a solid-liquid separation step.

6. Method according to claim 3, wherein the solid-solid separation is executed using an electromagnetic field.

7. Method according to claim 6 additionally comprising, after the solid-solid separation step, a solid-liquid separation step.

8. Method according to claim 3, wherein the solid-solid separation is executed using a floatation technique.

9. Method according to claim 8 additionally comprising, after the solid-solid separation step, a solid-liquid separation step.

10. Method according to claim 1, wherein at least some of the crystals containing at least one foreign element are separated from substantially the total amount of molten metal containing purified metal crystals.

11. Method according to claim 10, wherein a layer of salt is brought into contact with a layer of the molten metal containing both the purified metal crystals and crystals containing at least one foreign element, and wherein means are used to transport at least some of the crystals containing at least one foreign element into the salt layer and at least some of the purified metal crystals are separated from the molten metal.

12. Method according to claim 1, wherein the molten metal is aluminium.

13. Method according to claim 12, wherein the foreign element(s) comprise one or more of iron, silicon, copper, manganese and magnesium.

14. Method according to claim 1, wherein the purified metal crystals and crystals containing at least one foreign element are formed and separated continuously.

15. Method according to claim 1, wherein the molten metal containing one or more foreign elements is subjected to a fractional crystallisation process and a solid-liquid separation technique before the remaining molten metal is cooled to a eutectic temperature to simultaneously form purified metal crystals and crystals containing at least one foreign element.

16. Method according to claim 1, wherein molten metal containing one or more foreign elements remaining after the solid-solid separation step is subjected to a fractional crystallisation process and a solid-liquid separation technique.

17. Method according to claim 16, wherein the molten metal containing one or more foreign elements remaining after the solid-liquid separation technique is cooled to a eutectic temperature to simultaneously form purified metal crystals and crystals containing at least one foreign element, and at least some of these crystals containing at least one foreign element, formed after the solid-liquid separation technique, are separated from the purified metal crystals by solid-solid separation.

* * * * *